(12) United States Patent
Grady

(10) Patent No.: US 9,408,251 B2
(45) Date of Patent: Aug. 2, 2016

(54) TRANSMITTING DATA WITHIN A MESH NETWORK

(75) Inventor: Robert Henry Grady, Rumford, RI (US)

(73) Assignee: Mueller International, LLC, Atlanta, GA (US)

( * ) Notice: Subject to any disclaimer, the term of this patent is extended or adjusted under 35 U.S.C. 154(b) by 151 days.

(21) Appl. No.: 13/556,270

(22) Filed: Jul. 24, 2012

(65) Prior Publication Data

US 2014/0029567 A1 Jan. 30, 2014

(51) Int. Cl.
*H04W 84/18* (2009.01)
*H04W 4/00* (2009.01)
*H04L 1/18* (2006.01)
*H04L 29/08* (2006.01)

(52) U.S. Cl.
CPC ............... *H04W 84/18* (2013.01); *H04L 1/188* (2013.01); *H04L 67/12* (2013.01); *H04L 67/325* (2013.01); *H04W 4/006* (2013.01)

(58) Field of Classification Search
CPC ..... H04W 84/18; H04W 84/20; H04W 4/006; H04L 1/16; H04L 1/188; H04L 67/12; H04L 67/325
USPC ........................................................ 370/330
See application file for complete search history.

(56) References Cited

U.S. PATENT DOCUMENTS

| | | |
|---|---|---|
| 8,194,636 B1 | 6/2012 | Doherty et al. |
| 2005/0180356 A1 | 8/2005 | Gillies et al. |
| 2007/0089037 A1* | 4/2007 | Jiang .............................. 714/776 |
| 2008/0040509 A1* | 2/2008 | Werb et al. ..................... 709/242 |
| 2008/0068217 A1 | 3/2008 | Van Wyk et al. |
| 2009/0122775 A1* | 5/2009 | Haartsen ........................ 370/338 |
| 2010/0037105 A1* | 2/2010 | Bourlas .......................... 714/57 |
| 2010/0075600 A1* | 3/2010 | Haartsen ....................... 455/41.2 |
| 2010/0232369 A1 | 9/2010 | Jing et al. |
| 2011/0032884 A1* | 2/2011 | Yu et al. ......................... 370/329 |
| 2011/0066297 A1 | 3/2011 | Saberi |
| 2013/0102251 A1* | 4/2013 | Linde et al. .................. 455/41.2 |
| 2013/0202013 A1* | 8/2013 | Van Stralen et al. .......... 375/133 |

OTHER PUBLICATIONS

Grady, Robert Henry; International Search Report and Written Opinion for serial No. PCT/US13/51604, filed Jul. 23, 2013, mailed Feb. 10, 2014, 8 pgs.

(Continued)

*Primary Examiner* — Alpus H Hsu
*Assistant Examiner* — Walter Divito
(74) *Attorney, Agent, or Firm* — Taylor English Duma LLP

(57) ABSTRACT

Systems and methods for communicating data within mesh networks are provided. According to one implementation, a data communication node comprises a radio frequency (RF) driver configured to transmit RF signals to and receive RF signals from a remote device via an antenna. The node further comprises a timing device configured to establish a plurality of sequential time periods having start times and end times in synchronization with corresponding time periods of the remote device. The node also includes a memory device configured to store a frequency channel table listing a predetermined sequence of channels, the table also being stored in the remote device. Furthermore, the node comprises a transmitting module configured to forward information related to a data packet to the RF driver for transmission over a channel of the predetermined sequence of channels to the remote device during a first of the plurality of sequential time periods.

17 Claims, 5 Drawing Sheets

(56) References Cited

OTHER PUBLICATIONS

Grady, Robert Henry; International Preliminary Report on Patentability for serial No. PCT/US13/51604, filed Jul. 23, 2013, mailed Feb. 5, 2015, 7 pgs.

Grady, Robert Henry; Mexico Office Action for serial No. MX/a/2015/000918, filed Jul. 23, 2013, mailed Feb. 15, 2016, 6 pgs.

Grady, Robert Henry; Extended European Search Report for serial No. 13823080.0, filed Jul. 23, 2013, mailed Feb. 25, 2016, 9 pgs.

* cited by examiner

TRANSMITTING DATA WITHIN A MESH NETWORK

TECHNICAL FIELD

The present disclosure generally relates to mesh networks, and more particularly relates to transmitting data within mesh networks in high-traffic or noisy environments.

BACKGROUND

Typically, utility meters (e.g., gas meters, water meters, electricity meters, etc.) are read manually by meter readers who are employees or contractors of the various utility providers. Manual meter reading represents a significant cost to a typical utility provider. However, with the advent of wireless technology including mesh networking, utility providers have sought methods and systems for remote reading of water meters and even the remote control of water supply valves.

Advanced Metering Infrastructure (AMI) or Advanced Metering Management (AMM) include systems that measure, collect and analyze utility data using advanced metering devices, such as advanced water meters, gas meters, and electricity meters. In addition to measuring the various utilities, the advanced metering devices are also configured with communication circuitry, enabling the metering devices to transmit and receive data through an AMI network. In a typical configuration, an advanced metering device (e.g., an advanced water meter) measures and collects usage data (e.g., water usage data) at a customer's location. The metering device then uses a communication interface to transmit data to a parent node up through the hierarchy of the mesh network, often in response to the parent node's request for such information. The meter data can ultimately be transmitted up the mesh network to a collector associated with the utility provider. In this way, the utility providers may remotely "read" customer usage data for billing purposes.

The transmitting and receiving components of the mesh network (i.e., utility provider, nodes, meters, etc.) may communicate using radio frequency (RF) transmission. However, some environments may include a large amount of electromagnetic noise or a large amount of communication traffic, making communications between devices more difficult. Therefore, there is a need for more robust systems that are capable of operating in less than perfect conditions, such as in high-traffic or noisy environments.

SUMMARY

The present disclosure relates generally to mesh networks and more specifically to systems and methods for transmitting data within the mesh networks. According to one implementation, a data communication node within a mesh network comprises a radio frequency (RF) driver configured to transmit RF signals via an antenna to a remote device and receive RF signals from the remote device via the antenna. The node further comprises a timing device configured to establish a plurality of sequential time periods, where each time period has a start time and an end time in synchronization with corresponding sequential time periods of the remote device. The node also includes a memory device configured to store a frequency channel table listing a predetermined sequence of frequency channels, wherein the frequency channel table is also stored in the remote device. Furthermore, the node comprises a transmitting module configured to forward information related to a first data packet to the RF driver for transmission over a first frequency channel of the predetermined sequence of frequency channels to the remote device during a first time period of the plurality of sequential time periods.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure describes systems and methods for communicating information within a mesh network. Mesh networks and mesh networking devices may be utilized with Advanced Metering Infrastructure (AMI) systems for measuring utility data at multiple locations and communicating the readings to a utility provider. In response to receiving the utility data, the utility provider can determine billing information for its customers. Utility measurements may be performed by various types of meters, such as electric meters, water meters, gas meters, etc. In mesh networks, the meters are configured to forward their readings to the utility provider either in a direct manner or via one or more nodes. Since meters may be dispersed widely throughout a region, they often require intermediate nodes for forwarding the information to the utility provider.

While the present disclosure relates to mesh networking, as those having ordinary skill in the art will recognize, the present disclosure may be utilized in other types of networking environments as well. Within a mesh network, "parent" and "child" nodes have a predefined relationship based on hierarchy. Although the present disclosure describes relationships of a single parent with multiple children, it should be understood that multiple parents may exist within the same network. Furthermore, a child may have multiple parents, or a single parent may be paired with a single child. As an example, child nodes may represent individual customers' utility meters while a parent node may represent a data collection device primarily responsible for collecting data from and sending data to each child device.

As used herein, a "master" device is a device that is attempting to send data to another device. A "slave" device is a target device to which the master is attempting to send the data. A master device may be either a parent or a child. As used herein, "parent" and "child" nodes should not be confused with "master" and "slave" devices.

According to the implementations disclosed herein, systems and methods are provided for communicating data between nodes of a mesh network. After preliminary steps to link two nodes together, such as by awakening devices from various types of sleep modes and by synchronizing the timing aspects of the devices, the nodes can begin to communicate data between them. One object of the present disclosure is to save battery life of the nodes in the mesh network that run on battery power. The nodes attempt to transmit data via a number of different channels if necessary. However, the failed attempts on one channel are repeated on another channel, but only up to a certain limit before it is determined that the environment is too noisy.

Figure 1:
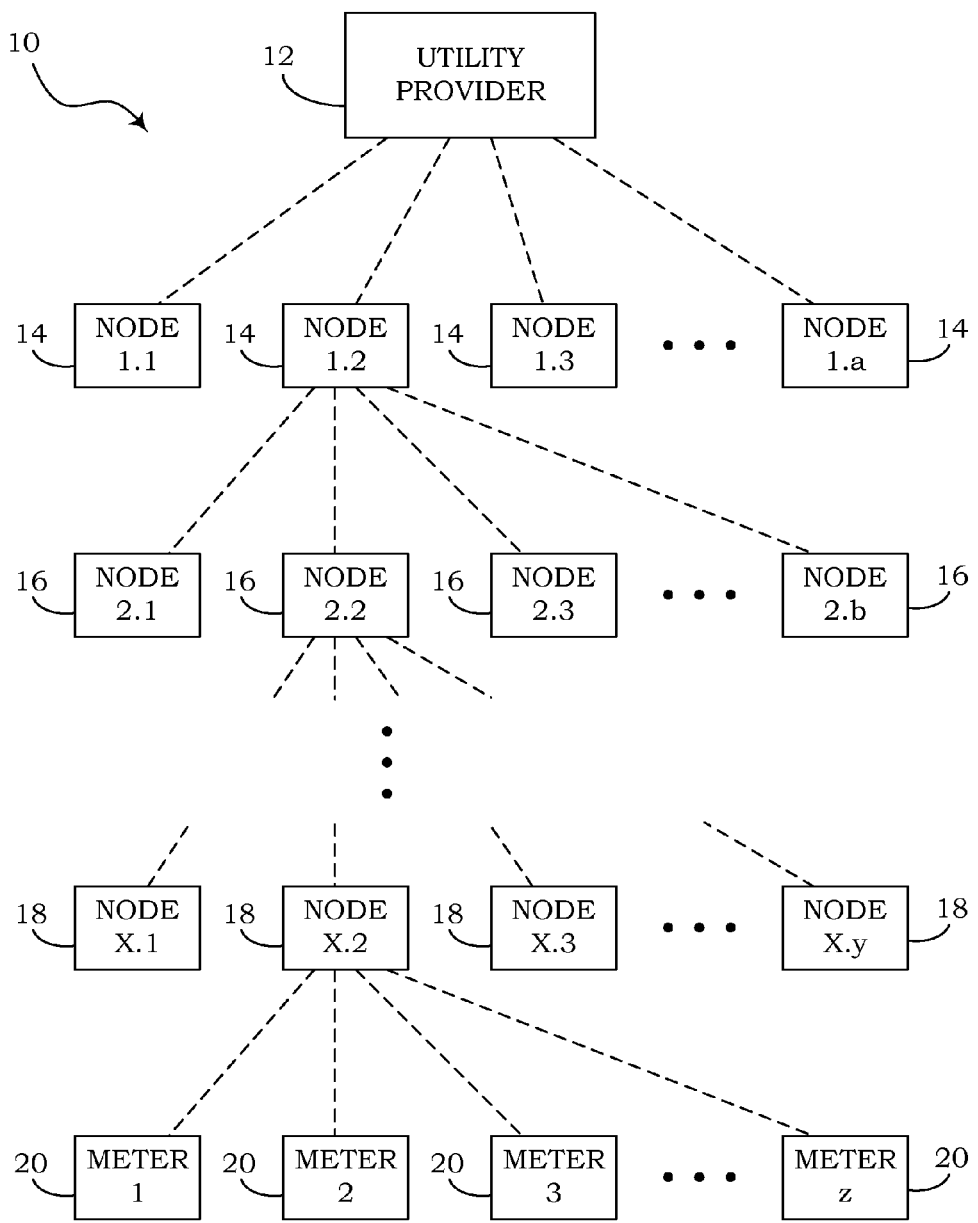
FIG. 1 is a block diagram illustrating an AMI mesh network according to various implementations of the present disclosure.

FIG. 1 is a block diagram showing an embodiment of a mesh network 10 (such as an AMI mesh network) in a hierarchical configuration. The configuration of components of the mesh network 10 shown in FIG. 1 is merely one embodiment, and additional devices or alternative configurations may be used. Although the mesh network 10 may typically be distributed throughout a geographical region, the block diagram of FIG. 1 shows a hierarchy to emphasize the parent/child relationships among the various components. As illustrated, the mesh network 10 includes a utility provider 12, a first level of intermediate nodes 14, a second level of intermediate nodes 16, a lowest level of intermediate nodes 18, and meters 20. In some embodiments, the intermediate nodes may be meters themselves or may be integrated with or connected to meters. Also, the meters 20 may further act as intermediate nodes to additional meters. In some embodiments, the intermediate nodes may be configured as stand-alone devices for assisting in the transfer of data between the utility provider 12 and meters 20. The mesh network 10 may include any number of levels X of intermediate nodes between the utility provider 12 and the meters 20. The number of levels between the meters 20 and the utility provider 12 is not necessarily the same for each meter 20. Some of the nodes 14, 16, 18 may be configured as meters as well and may be capable of both measuring utility data and communicating with lower level nodes and/or meters. In some embodiments, meters 20 may further act as nodes or even may become a node to child meters as additional meters are added to the network.

The utility provider 12, acting as a parent, communicates directly with intermediate nodes 1.1, 1.2, 1.3, . . . 1.a of the first level of intermediate nodes 14, which may be defined as child nodes with respect to the utility provider 12. Any number "a" of intermediate nodes 14 may be configured in the first level. Each of the intermediate nodes 14 in the first level may be configured as a parent to one or more intermediate nodes 16 in the second level and communicate directly with these intermediate nodes 16. The intermediate nodes 14 may include any number "b" of child nodes 16. In this example, the intermediate node 1.2 of the first level of nodes 14 has child nodes 2.1, 2.2, 2.3, . . . 2.b in the second level of intermediate nodes 16. This arrangement continues down the hierarchy to the lowest level of intermediate nodes 18, which may include any number "y" of nodes. Node X.2, for example, is illustrated with a number "z" of meters 20, which are configured as children of node X.2. Further, each child node may have multiple parent nodes; for example, node 2.2 may have as its parent nodes 1.1, 1.2, and 1.3.

The utility provider 12, intermediate nodes 14, 16, 18, and meters 20, according to various implementations, may comprise circuitry and functionality to enable radio frequency (RF) communication among the various components. The dashed lines shown in FIG. 1 may therefore represent RF communication channels between the different components. The wireless communication between the devices 12, 14, 16, 18, and 20 may be active during some periods of time (when two respective devices are linked) and may be inactive during other periods of time (when the devices are not linked and/or are in sleep mode). Alternatively, any of the nodes may be connected together through wired connections.

The utility provider 12, or a server associated with the utility provider 12, may be configured to manage the relationships between the various intermediate nodes and meters. In some cases, the parent/child relationships may be changed as needed to more evenly distribute the child nodes among the parents. The utility provider 12 may maintain a table of child nodes of each intermediate node and those meters associated with the lowest-level intermediate nodes 18 in a child relationship. In some embodiments, the intermediate nodes themselves may automatically configure and/or re-configure their own parent/child relationships with one another.

Existing AMI deployments rely on and utilize mesh networks and mesh networking devices to transmit and to receive data between nodes within the utility provider's network. Many of these devices employ frequency-hopping spread spectrum (FHSS) technology in compliance with Federal Communications Commission (FCC) rules and regulations part 15 (47 C.F.R. §15). FHSS is a method of transmitting and receiving radio signals by rapidly switching among many frequency channels using a pseudorandom channel sequence known to both the transmitting and receiving devices. After transmitting data on one channel, the devices hop to the next channel for the transmission of more data.

The intermediate nodes 14, 16, and 18 may remain in a sleep mode until a related parent or child wishes to communicate with the node. In this case, the device wishing to establish communication with the intermediate node is considered to be the master device and the intermediate node itself is the slave device. The master device sends a hailing signal, which, when received, causes the slave device to awaken from the sleep mode. For synchronizing the master and slave devices, the master device then sends a ping signal and the slave returns a pong signal. These signals establish time synchronization characteristics between the devices. When synchronized, the master device is able to transmit data to the slave device.

The components of the mesh network 10 are configured to store a predefined pseudorandom "hailing" channel frequency set. In some embodiments, the hailing channel frequency set includes a sequence of 50 or more frequency channels that are established for some or all components in the mesh network 10. Each device is tuned to the appropriate channel of the hailing channel frequency set based on a system clock. In this way, when a device wishes to hail a slave device, both devices will be operating on the same channel. In addition to the hailing channels, the mesh network 10 further includes a predefined pseudorandom "data" channel frequency set. For example, the data channel frequency set may also include 50 or more frequency channels that are established for some or all of the components of the mesh network 10. When a master device hails a slave device and is synchronized with the slave device, the master device may then transmit data over the predefined pseudorandom data channel frequency set in a predetermined order. Both devices are tuned to the same channels of the data channel frequency set at the same time to allow for data communication.

Hailing channels and data channels are selected from the 902-928 MHz industrial, scientific, and medical (ISM) bandwidth. A problem that may occur with attempting to transmit signals in this frequency band is that it is an unlicensed frequency band shared by other devices such as garage door openers and baby monitors. When located near the nodes, these devices may cause interference at certain frequencies. In one embodiment, one hundred (100) channels are chosen with a minimum channel spacing of 100 kHz each. Fifty (50) of the channels may be assigned to the pseudorandom data channel frequency set, and fifty (50) channels may be assigned to the hailing channel frequency set. According to various implementations, the data channels may all be different from, may all be the same as, or may include a subset of channels that are the same as the hailing channels. In some embodiments, different channel spacing, a different number of total channels, a different number of hailing channels, and/or a different number of data channels may be used. When sending and receiving data messages, the devices hop through the data channel frequency set to assure that, on average, all data channels are used equally, according to FCC rules. After the last frequency channel is used (e.g., the 50th channel), the device hops back to the first frequency channel in the list and proceeds through the list as many times as necessary.

A non-limiting, exemplary set of 50 data channels (beginning with data channel 0 and continuing through data channel 49) includes the following frequencies:

| Ch. | Freq. | Ch. | Freq. | Ch. | Freq. | Ch. | Freq. |
|---|---|---|---|---|---|---|---|
| 0 | 922.94 MHz | 1 | 922.1 MHz | 2 | 923.78 MHz | 3 | 922.46 MHz |
| 4 | 926.9 MHz | 5 | 927.26 MHz | 6 | 922.82 MHz | 7 | 923.3 MHz |
| 8 | 927.86 MHz | 9 | 927.5 MHz | 10 | 923.9 MHz | 11 | 926.42 MHz |
| 12 | 925.46 MHz | 13 | 927.38 MHz | 14 | 926.3 MHz | 15 | 925.7 MHz |
| 16 | 925.1 MHz | 17 | 926.18 MHz | 18 | 925.94 MHz | 19 | 924.02 MHz |
| 20 | 927.98 MHz | 21 | 926.66 MHz | 22 | 924.98 MHz | 23 | 927.62 MHz |
| 24 | 924.74 MHz | 25 | 925.22 MHz | 26 | 925.34 MHz | 27 | 924.62 MHz |
| 28 | 924.5 MHz | 29 | 926.54 MHz | 30 | 924.14 MHz | 31 | 923.66 MHz |
| 32 | 925.58 MHz | 33 | 922.22 MHz | 34 | 924.26 MHz | 35 | 927.02 MHz |
| 36 | 922.34 MHz | 37 | 926.06 MHz | 38 | 926.78 MHz | 39 | 923.42 MHz |
| 40 | 927.74 MHz | 41 | 924.86 MHz | 42 | 924.38 MHz | 43 | 922.7 MHz |
| 44 | 922.58 MHz | 45 | 925.82 MHz | 46 | 923.54 MHz | 47 | 927.14 MHz |
| 48 | 923.18 MHz | 49 | 923.06 MHz | | | | |

According to various implementations, the data channel frequency set may be unique to each node within the system, or the data channel frequency set may be the same or contain a portion of the same frequency channels for each node. Regarding embodiments in which not all the data frequency channels are the same, each node may include a "nodeID" which identifies it within the mesh network 10. A device wishing to send a communication to a target device utilizes the target device's "nodeID" to identify the correct hailing channel frequency set and data channel frequency set to use for that particular target device. The "nodeID" may be an alphanumeric string associated with and unique to a device.

Figure 2:
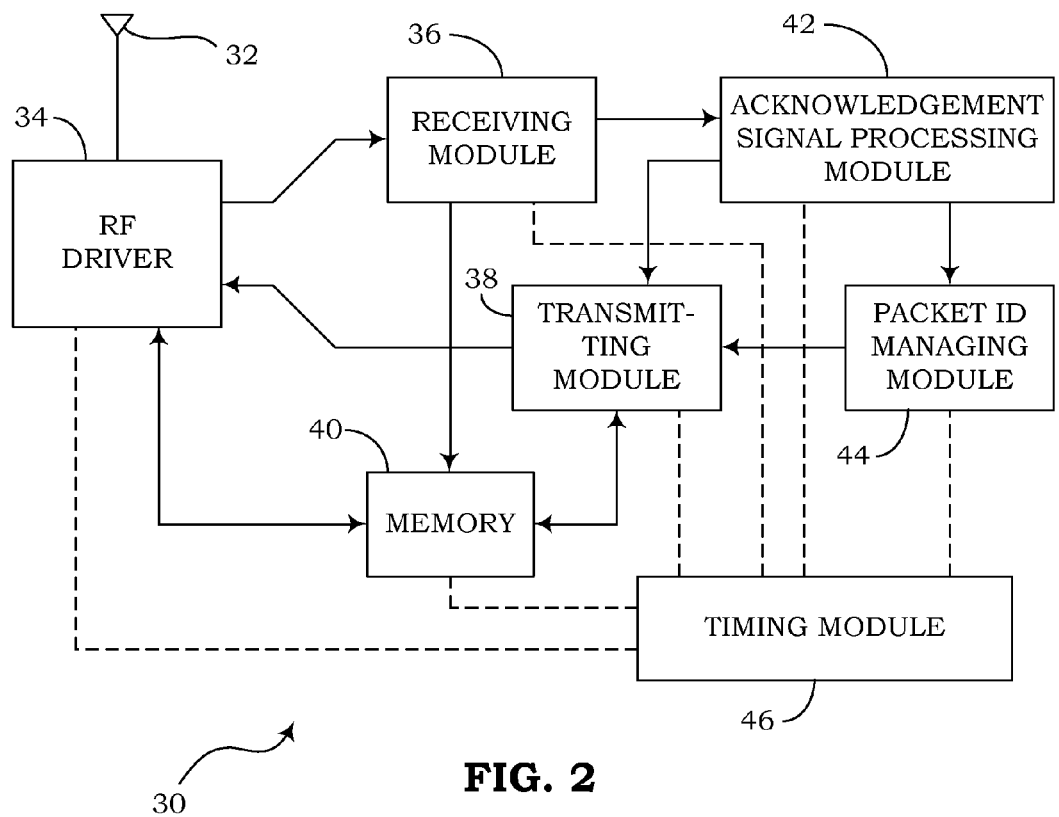
FIG. 2 is a block diagram illustrating a node within a mesh network according to various implementations of the present disclosure.

FIG. 2 is a block diagram showing an embodiment of a node 30 configured to communicate data within a mesh network. For example, the node 30 may represent any of the nodes 14, 16, 18 or any of the meters 20 shown in FIG. 1. Each of the elements of the node 30 may be configured in hardware, software, and/or firmware, as will be apparent to one of ordinary skill in the art. In the embodiment of FIG. 2, the node 30 includes an antenna 32, a radio frequency (RF) driver 34, a receiving module 36, a transmitting module 38, a memory 40, an acknowledgement signal processing module 42, a packet ID managing module 44, and a timing module 46. The node 30 may also include a processing device (not shown) for managing the various components and their functions. Particularly, the various components may have multiple functions, where some functions may be applicable when the node 30 is configured as a master device and where other functions may be applicable when the node 30 is configured as a slave device. That is, the node 30 may act as a master device at some times and as a slave device at other times, depending on the particular application and/or direction of data flow.

The memory 40 is configured to store data, which may be divided into data packets of about 100 bytes each. The data transfers between nodes may include from about one data packet to about 1200 data packets. In order to store 1200 data packets, the memory 40 will be capable of storing at least 120 kilobytes of data. In addition, the memory 40 is also configured to store the hailing frequency channel table and the data frequency channel table including the sequence of frequency channels over which the hailing signals and data are transferred.

The RF driver 34 may be configured as a transceiver for both receiving signals detected on the antenna 32 and transmitting signals via the antenna 32. The RF driver 34 may include amplifiers or other amplification circuitry for amplifying the signals as needed. The RF driver 34 forwards signals that are received on the antenna 32 to the receiving module 36. Signals that are intended to be transmitted are forwarded from the transmitting module 38 to the RF driver 34 for transmission via the antenna 32.

When the node 30 is inactive, the device may go into a sleep mode and periodically awaken (e.g., in a low-power partially-awake mode) to listen for a hailing signal from a master device, which may be another node within the mesh network 10. When a hailing signal is detected, the node 30 fully awakens in a slave mode and listens for time synchronization signals from the master device. After the node 30 receives the synchronization signals, the node 30 (as a slave device) and the master device will be able to communicate in a data transmission mode. In the data transmission mode, the node 30 may be able to receive data packets over a plurality of predetermined data frequency channels during predetermined timing periods.

In the slave mode, the node 30 sequentially receives data packets one at a time. The received packets are forwarded to the receiving module 36, which is configured to store the data packets in a memory device (e.g., memory 40). The receiving module 36 notifies the acknowledgement signal processing module 42 that data has been received. The acknowledgement signal processing module 42 is configured to prepare an acknowledgement signal (e.g., ACK) to be transmitted back to the master device to indicate that the packet has been received. The receiving module 36 is also configured to extract a packet ID from the data signals and forward the packet ID to the acknowledgement signal processing module 42. The transmitting module 38 receives an indication from the acknowledgement signal processing module 42 that an acknowledgement signal is to be transmitted to the master device and also receives the packet ID, which may be transmitted along with the ACK signal.

The packet ID managing module 44 checks to determine if the packet ID of the data packet just received is the same packet ID as a data packet received immediately before the current packet. The reason for making this determination is explained as follows. The master device assigns a unique packet ID to each data packet. When the master device sends a packet (along with the corresponding packet ID) but does not receive an ACK signal in return, the master device re-sends the same packet over the next frequency channel during the next time period. There may be several reasons why the master does not receive an ACK signal. The first is that the slave device did not receive the packet and therefore never sent an ACK signal. The second reason is that the slave device may have received the packet and replied with the ACK signal, but the ACK signal was not received by the master device. Thus, in the case of this second scenario in which the slave device receives a data packet but the ACK signal does not reach the master device for whatever reason, the packet ID managing module 44 is able to determine that the packet ID is the same as that of the previous packet. Such a determination indicates that there was an error (from the viewpoint of the master device) and re-transmission was attempted on a different channel. This error can also be noted by the slave device as explained below.

Since the slave device (i.e., node 30) can detect the errors based on the packet ID comparison, the slave device may count when a number of consecutive failures occurs. After a predetermined number of consecutive failures (e.g., thirty failures), the master device will consider that the link between the master and slave devices is dead (i.e., the transmission session was unsuccessful) and will stop transmitting. This scenario may occur in high-traffic areas, such as dense urban settings having many possible interfering devices, as mentioned previously. Assuming a hopping rate of once every 270 msec and unsuccessfully attempting to transmit a data packet thirty consecutive times over thirty different frequencies, the amount of time that it would take to determine that the link is dead is about 8 seconds. When it is determined that the link is dead, the slave device may also stop listening for transmissions and return to the sleep mode. In some embodiments, the master device may attempt to hail the slave device at a later time to attempt to transmit the data again.

The node 30 further comprises a timing module 46 that is configured to provide clock signals to each of the components of the node 30. As mentioned with respect to FIG. 3, the timing module 46 is synchronized to a similar device on the corresponding master device to ensure that both devices are synchronized. In some embodiments, the timing module 46 may include a countdown timer or other type of timer to count for a predetermined length of time. The timer may start at the beginning of a time period and detect when a certain time has elapsed (i.e., until the end of the time period). When the time period ends, the node 30 hops to the next frequency channel. The timing module 46 establishes sequential time periods, where each time period include a predetermined length of time set during the synchronization stage before a data transmission stage begins. According to a maximum packet size, transmission lag, processing time, and other factors, the predetermined time period may be set between about 200 milliseconds and 400 milliseconds. In some embodiments, the time period may have a length of 270 milliseconds.

Not only can the node 30 act as a slave device, as mentioned above, but it may also act as a master device. In a master mode, the transmitting module 38 retrieves one data packet at a time from the memory 40 and transmits it via the RF driver 34. If the data message that is to be transmitted is not already broken up into individual transmittable packets according to some embodiments, then the memory 40 or transmitting module 38 may be configured to divide the data message into individual packets. Each packet, for example, may be about 100 bytes of data. After transmitting a data packet, the node 30 waits to receive an ACK signal by the receiving module 36. In response to receiving the ACK signal, if one is received, the receiving module 36 informs the acknowledgement signal processing module 42 of the receipt of the signal. Also, the packet ID sent along with the ACK signal can be analyzed by the packet ID managing module 44 to determine if the proper packet had been received. If so, the packet ID managing module 44 may increment the packet ID for the transmission of the next data packet. When transmission of a data packet is successful, the transmitting module 38 retrieves a next data packet from memory 40 and transmits this packet to the slave device.

If the acknowledgement signal processing module 42 does not detect an ACK signal, the transmitting module 38 is configured to re-transmit the same data packet containing the same packet ID. However, in this repeated attempt, the data packet is sent over a next frequency channel in the frequency channel sequence, wherein the sequence of data frequency channels are stored in a table or listed in some other format in the memory 40. This re-transmission takes place at the beginning of the next time period, controlled by the timing module 46. The acknowledgement signal processing module 42 may further be configured to count the number of consecutive times that transmission is unsuccessful. If transmission is unsuccessful a predetermined number of times in a row, the data transmission session is considered to be a failure and the transmitting module 38 is instructed to stop transmitting signals. If the data transmission session is a failure, the node 30 may attempt to hail the slave device at a later time in order to attempt to transmit the data again, perhaps when there is less communication traffic, noise, or interference between the nodes.

According to various embodiments, the data communication node 30 within the mesh network comprises the RF driver 34 configured to transmit RF signals via the antenna 32 to a remote device and receive RF signals from the remote device via the antenna 32. The node 30 also includes the timing module 46 configured to establish a plurality of sequential time periods, each time period having a start time and an end time in synchronization with corresponding sequential time periods of the remote device. In some embodiments, each of the plurality of sequential time periods may be 270 milliseconds long. The time periods may be indicative of a hopping rate, which refers to the rate at which the devices hop from one frequency to the next in the data frequency channel table. The node 30 also includes the memory 40 configured to store a frequency channel table listing a predetermined sequence of frequency channels, wherein the frequency channel table is also stored in the remote device. The node 30 also includes the transmitting module 38 configured to forward information related to a first data packet to the RF driver 34 for transmission over a first frequency channel of the predetermined sequence of frequency channels to the remote device during a first time period of the plurality of sequential time periods.

In some embodiments, the data communication node 30 may be a master device and the remote device is a slave device. The information related to the first data packet mentioned above may be the first data packet itself. If during the first time period the RF driver 34 does not receive an acknowledgement signal from the slave device indicating that the first data packet was received, the transmitting module 38 is further configured to forward the first data packet to the RF driver 34 for transmission over a second frequency channel to the slave device during a second time period. The RF driver 34 is further configured to repeat the transmission of the first data packet over the next frequency channels according to the predetermined sequence during the next time periods until the acknowledgement signal is received. If the acknowledgement signal is not received after repeating the transmission a predetermined number of times (e.g., thirty times), the RF driver 34 stops transmitting the data packet and the data transmission session ends. If, during the first time period, the RF driver 34 receives an acknowledgement signal indicating that the first data packet was received, the transmitting module 38 is further configured to forward a second data packet to the RF driver 34 for transmission over a second frequency channel to the slave device during a second time period.

In other embodiments, the data communication node 30 may be a slave device and the remote device is a master device. The information related to the first data packet, as mentioned above, may be an acknowledgement signal in this case indicating that the first data packet was received. If the RF driver 34 does not receive a data packet during the first time period, the RF driver 34 does not transmit the acknowledgement signal during the first time period, but is further configured to listen to receive the first data packet over a second frequency channel during a second time period. The RF driver 34 is further configured to listen to receive a next data packet over a next frequency channel during a next time period.

The data communication node 30 may further comprise the receiving module 36 configured to receive data packets (when acting in a slave state) from a master device and store the data packets in the memory 40. The receiving module 36 is further configured to receive acknowledgement signals (when acting in a master state) from a slave device and forward the acknowledgement signals to the acknowledgement signal processing module 42. The data communication node 30 may further comprise the packet ID managing module 44, wherein the acknowledgement signal processing module 42 is configured to instruct the packet ID managing module 44 to increment (e.g., increment by 1) a packet ID to be transmitted with the next data packet.

Figure 3:
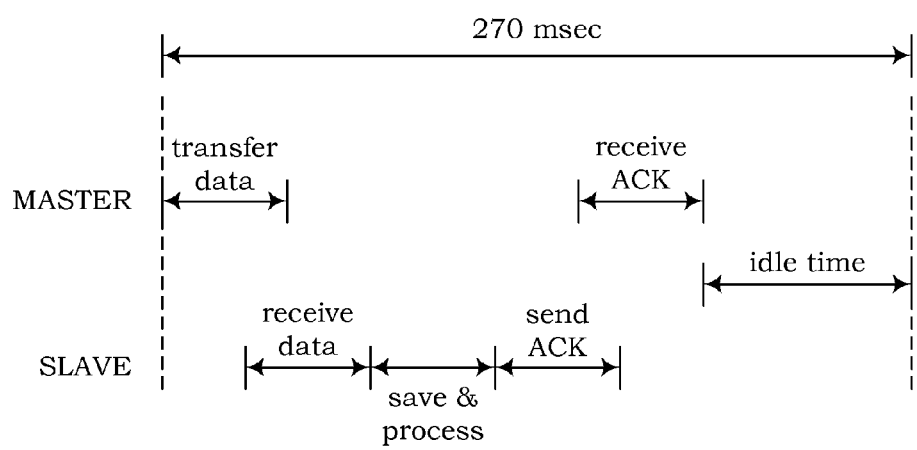
FIG. 3 is a timing diagram illustrating a timing period for the transmission of data packets in a mesh network according to various implementations of the present disclosure.

FIG. 3 is a timing diagram showing an embodiment of events taking place during a period of time when a data packet is transmitted. According to this embodiment, a time period of 270 msec, for example, is set and agreed upon by the master and slave devices. At the beginning of the time period (e.g., when a clock signal is generated by the timing module 46), the master device transmits the data. Assuming a slight lag time due to transmission through a particular medium (e.g., air), the slave device is configured to receive the data. Upon receiving the data packet, the slave device saves the packet and processes various information in the packet, such as a packet ID, header information, etc. The slave device then transmits an ACK signal that is received after a slight delay by the master device. In some embodiments, there may be a variable idle time before a new time period starts depending on various factors. Immediately after the time period ends, the next time period starts and the process is repeated for the next data packet. Alternatively, if the ACK signal (or lack of ACK signal) indicates an unsuccessful transmission of the first packet, the same packet is transmitted again during the next time period. The process may be repeated until all the data packets have been successfully transmitted to the slave device.

Figure 4:
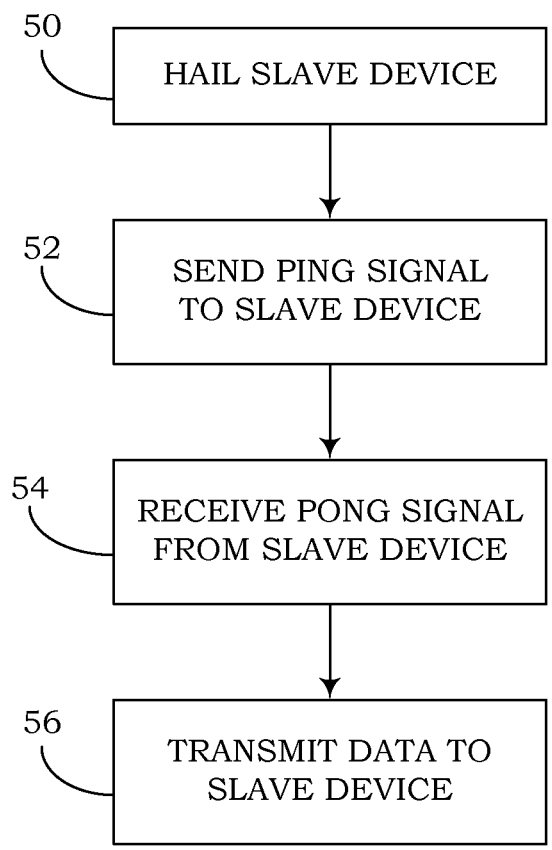
FIG. 4 is a flow diagram illustrating a method of an overall data transmission session within a mesh network according to various implementations of the present disclosure.

FIG. 4 is a flow diagram illustrating an embodiment of a general transmission session from a master device to a slave device. As indicated in block 50, the master device transmits one or more hailing signals in order to gain the attention of a slave device. For example, the slave device may be in a sleep mode and may need to be awakened. Sleep modes may include devices being completely off, devices being partially off and only checking at certain times to see if a hailing signal is being transmitted by another device, or even a sleep mode where some devices are on and some are off. Then, according to block 52, the master device sends a ping signal to the slave device. The ping signal, for example, may include time synchronization information and other types of information for preparing the master and slave devices for a data transmission session. As indicated in block 54, the master device receives a pong signal from the slave device recognizing and agreeing to the synchronization information and other criteria. Once the devices are synchronized, the master device begins to transmit the data to the slave device, as indicated in block 56. This final step of transmitting data is explained in more detail below with respect to FIGS. 5 and 6, where FIG. 5 defines the functions and/or steps of the master device and FIG. 6 defines the functions and/or steps of the slave device.

Figure 5:
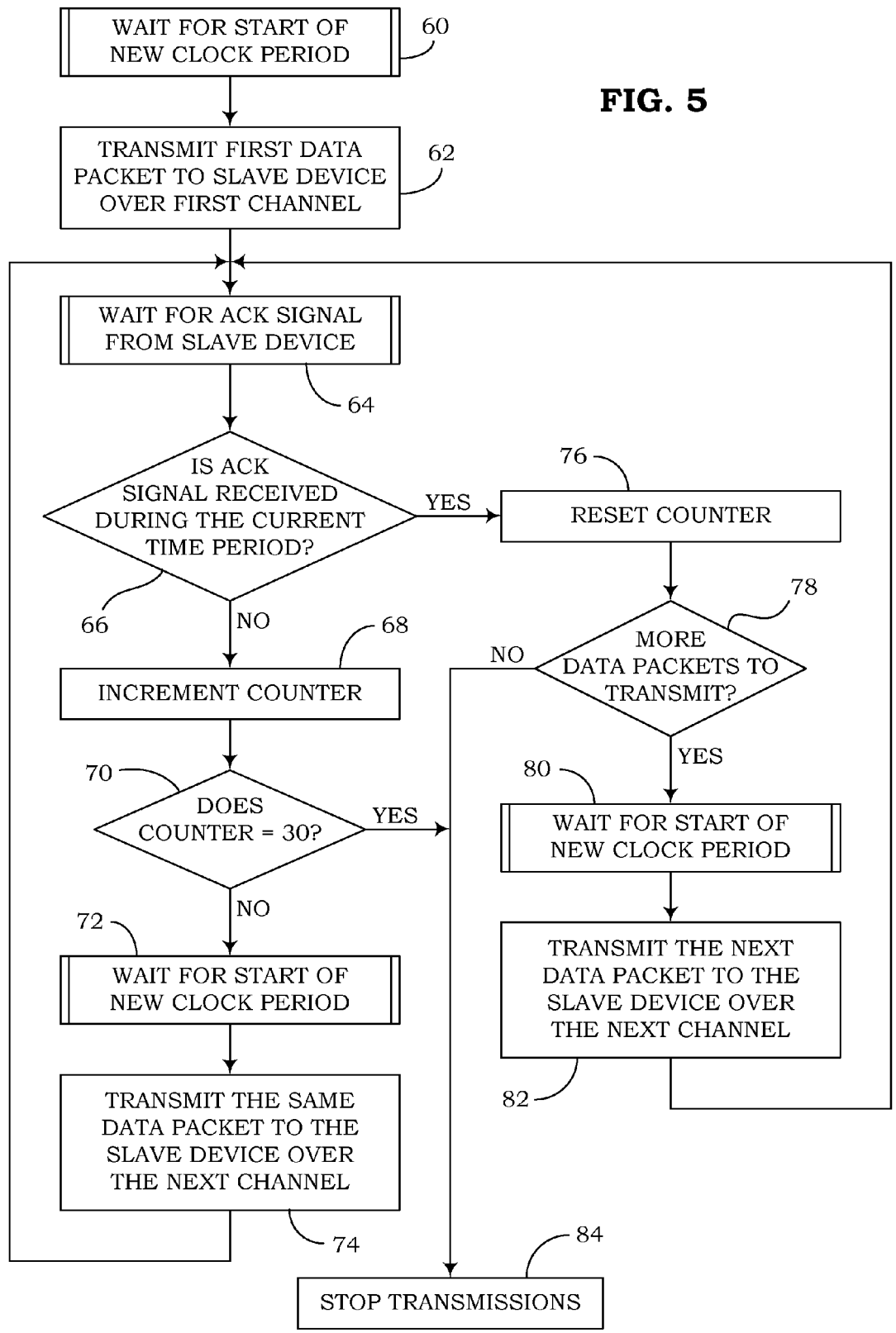
FIG. 5 is a flow diagram illustrating a method for transmitting data within a mesh network according to various implementations of the present disclosure.

FIG. 5 is a block diagram illustrating an embodiment of a method of a master device for transmitting data. As indicated in block 60, the master device waits for the start of a new clock period. Using the timing diagram shown in FIG. 3 as an example, the master device waits for the start of the 270 msec period. It should be noted that those blocks in FIGS. 5 and 6 that are shown with extra lines on the two sides indicate a waiting function and may include repeated detection until a particular condition is met (e.g., waiting or repeatedly detecting until a new clock period starts, or listening until a signal is eventually received). Referring again to FIG. 5, block 62 indicates that a first data packet is transmitted to the slave device over a first channel. As indicated in block 64, the master device waits (no longer than the predetermined time period) to receive an ACK signal from the slave device. Decision block 66 determines whether or not an ACK signal is received during the current time period. This determination may be assisted by a countdown timer or other timing device for defining the time period. If the ACK signal is received, the method branches off to block 76. Otherwise, if it is not received, the method proceeds to block 68.

As indicated in block 68, a counter is incremented (e.g., incremented by 1). The counter, for example, may be used to count the number of consecutive unsuccessful transmission attempts. In decision block 70, it is determined whether the counter has reached a predetermined number (e.g., thirty in this embodiment). In an alternative embodiment, instead of counting up to thirty, the counter may count up to a different number (e.g., two), such that only that number of channels are attempted. If a data packet cannot be successfully transmitted over those channels (e.g., two channels in the alternative embodiment), then the link is considered to be dead. However, according to a preferred embodiment, as illustrated in FIG. 5, the counter counts up to thirty, which means that even in high-traffic and/or noisy environments the system attempts to send a single data packet thirty different times over thirty different channels before giving up. With the ability of the present system to skip so many unsuccessful channels, it should be noted that transmission may be possible even in less than perfect environments. By using the methods herein, there may be a higher likelihood that one or more good channels may be found on which the data can be transmitted. Assuming that about 1200 data packets are to be transmitted using a 270 msec hopping rate, the data packets can be transmitted in about five minutes if few channels experience failure. However, if only about 10% of the channels are clear enough to enable data transmission, indicating a high level of traffic and/or noise, the process would likely take a much longer time to complete (e.g., about 50 minutes), but the current processes may still allow the data to be transmitted eventually even in such unfavorable conditions.

According to the preferred embodiment, if counter=thirty (step 70), the method goes to block 84 and stops transmissions. Stated another way, the master device allows for up to thirty consecutive unsuccessful transmissions before quitting. If the counter does not equal thirty, the method proceeds to block 72, which indicates that the master device waits for the start of the next clock period (e.g., the next 270 msec time period). As indicated in block 74, the master device transmits the same data packet to the slave device over the next frequency channel. Thus, if transmission is unsuccessful over one frequency channel, the master devices attempts to transmit the same data packet using another channel. After this step, the method returns back to block 64.

If it is determined in decision block 66 that the ACK signal is received, the method goes to block 76, which indicates that the counter is reset. In this case, the transmission is successful and the counter for counting consecutive unsuccessful attempts is set back to zero. After this successful transmission, it is determined in decision block 78 whether more data packets are to be transmitted. If the master device has transmitted the last data packet of a data message, the method goes to block 84 and the session is stopped. Otherwise, if more data packets are to be sent, the method proceeds to block 80. As indicated in block 80, the master device waits for the start of the next clock period. Then, the next data packet is transmitted to the slave device over the next channel (step 82). After transmission of the next data packet, the method loops back to block 64 and the process repeats for more packets as needed.

According to various embodiments, the present disclosure describes a method for transmitting data. The method comprises the steps of transmitting a data packet to a slave device during a predetermined time period, wherein the data packet is transmitted over a frequency channel listed in a predetermined sequence of frequency channels. The method also includes determining whether an acknowledgement signal is received from the slave device during the predetermined time period. If the acknowledgement signal is not received during the predetermined time period, the method includes transmitting the same data packet to the slave device over a next frequency channel listed next in the predetermined sequence of frequency channels during a next time period. If the acknowledgement signal is received during the predetermined time period, the method includes transmitting a next data packet to the slave device over the next frequency channel during the next time period.

In some embodiments, the method may further comprise the step of repeating the transmitting of the same data packet over the next frequency channels during the next time periods until an acknowledgement signal is received. The step of repeating the transmission comprises repeating the step of transmitting the same data packet up to a predetermined number of times (e.g., the predetermined number of times being equal to thirty). If the predetermined number of times is reached, the method discontinues. In some embodiments, each time period is 270 milliseconds, although other time periods may be preferable.

Figure 6:
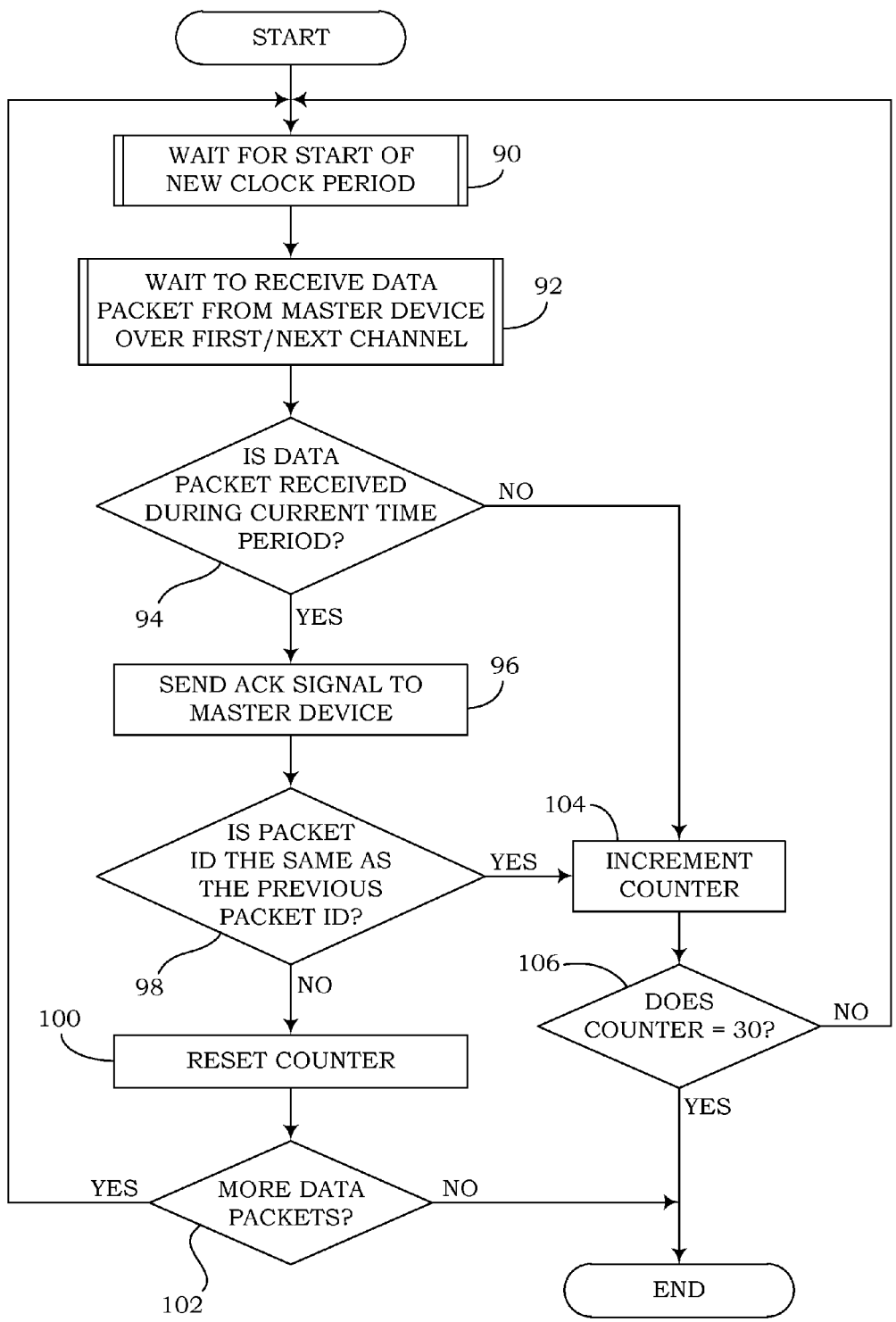
FIG. 6 is a flow diagram illustrating a method for receiving data within a mesh network according to various implementations of the present disclosure.

FIG. 6 is a flow diagram illustrating an embodiment of a method including steps performed by a slave device for receiving data from a master device. At the beginning, the slave device is configured to wait for the start of a new clock period, as indicated in block 90. The clock periods of the master and slave devices are synchronized to allow for effective transmission and receiving of signals. Block 92 indicates that the slave device then waits to receive a data packet from the master device over a first channel. When this block is repeated in later iterations, the slave device waits to receive a data packet over a next channel. The first and next channels include a predetermined sequence of channels that is understood and agreed upon by both the master device and slave device.

Decision block 94 determines whether or not a data packet was received during the current time period. If so, the method proceeds to block 96. Otherwise, the method flows to block 104. When it is determined that a data packet was received, block 96 shows that the slave device sends an ACK signal to the master device. As indicated in decision block 98, it is determined whether the packet ID of the received data packet is the same as a packet ID from a previous data packet. This step may be skipped the first time through the process since there will be nothing with which to compare the packet ID. The previous data packet, for example, may be the data packet immediately preceding the current data packet. If the packet ID is different, indicating that it is a new data packet, the method proceeds to block 100 and a counter is reset. The counter is used in this embodiment to count the consecutive number of failed transmissions. In this respect, block 100 is in the branch of the method where the transmission was successful and therefore the counter is returned to zero. As indicated in decision block 102, it is determined whether there are more data packets to receive. If not, the method ends. However, if more packets are to be received, the method returns to block 90 to repeat the processes. An indication that a data packet is the last data packet may be specifically included in the information transmitted with the data packet.

If it is determined in decision block 94 that a data packet was not received, or if it is determined in decision block 98 that a received data packet included the same packet ID as a previous packet, then the transmission is considered to be unsuccessful and the method proceeds to block 104. As indicated in block 104, the counter is incremented. As indicated in decision block 106, it is determined whether the counter has reached a predetermined number (e.g., thirty). As mentioned above with respect to FIG. 5, an alternative embodiment is described in which the counter only counts up to two, thereby allowing for only two consecutive failed transmissions. According to other embodiments, the methods may count up to any number. Referring again to the preferred embodiment, if there are thirty consecutive unsuccessful transmissions and the counter is equal to thirty, the method comes to an end and the slave device stops listening for more transmissions. In some embodiments, the slave device may return to a sleep mode and listen for hailing signals from the master device when another attempt at transferring the data is desired. If it is determined in block 106 that the counter has not reached thirty, the method loops back to block 90 to repeat the processes for receiving more data.

According to various implementations of the present disclosure, a method is provided for receiving data. The method may include the steps of waiting to receive a data packet from a master device over a frequency channel during a predetermined time period. The frequency channel may be listed in a sequence of frequency channels synchronized with the master device. If a data packet is received, the method includes sending an acknowledgement signal to the master device indicating that the data packet is received and waiting to receive a next data packet from the master device over a next frequency channel during a next time period. If a data packet is not received, the method includes waiting to receive the same data packet from the master device over the next frequency channel during the next time period.

Additionally, if a data packet is received, the method may further include the step of verifying an identification of the received data packet. The step of verifying the identification of the received data packet may comprise comparing the identification with an identification of a previously received data packet. The method may further include repeatedly waiting to receive next data packets from the master device over next frequency channels during next time periods.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A data communication utility metering device within a mesh network, the data communication utility metering device configured to function in either a master mode or a slave mode, comprising:
　a radio frequency (RF) driver configured to transmit RF signals via an antenna to a remote utility metering device and receive RF signals from the remote utility metering device via the antenna;
　a timing device configured to generate a plurality of timing signals to synchronize the data communication utility metering device with the remote utility metering device, the timing signals establishing a plurality of sequential time periods;
　a memory device configured to store a frequency channel table listing a predetermined sequence of frequency channels, the frequency channel table also being stored in the remote utility metering device;
　a transmitter configured to, when the utility metering device is in the master mode, forward information related to a first data packet to the RF driver for transmission over a first frequency channel of the predetermined sequence of frequency channels to the remote utility metering device during a first time period of the plurality of sequential time periods;
　a receiver programmed to perform the steps of:
　　when the utility metering device is in the slave mode, receiving a remote data packet from the remote utility metering device;
　　when the utility metering device is in the slave mode, storing the remote data packet in the memory device; and
　　when the utility metering device is in the master mode, receiving a remote acknowledgement (ACK) signal and a data packet identification (packet ID) from the remote utility metering device;
　an acknowledgement signal processing module programmed to perform the steps of:
　　when the utility metering device is in the master mode, receiving the remote ACK signal from the receiver for a successful transmission of a data packet or, if transmission of a data packet fails for two or more consecutive attempts, counting a number of times that transmission of the data packet is unsuccessful;
　　when the utility metering device is in the slave mode:
　　　receiving a signal from the receiver that the remote data packet has been received;
　　　preparing a local ACK signal indicating receipt of the remote data packet; and
　　　sending a signal to the transmitter indicating that the local ACK signal is to be transmitted to the remote utility metering device; and
　a packet ID manager configured to, when the utility metering device is in the master mode, analyze the packet ID to determine whether the proper packet had been received, and if so, to increment a packet ID to be transmitted with a next data packet,
　wherein, if the first data packet is successfully transmitted in the master mode between the data communication utility metering device and the remote utility metering device, the transmitter is further configured to forward information related to a second data packet to the RF driver for transmission over a next frequency channel of the predetermined sequence of frequency channels to the remote utility metering device during a next time period of the plurality of sequential time periods,
　wherein the information related to the first data packet includes at least the first data packet itself and the information related to the second data packet includes at least the second data packet itself, and
　wherein, if during the first time period the RF driver does not receive the remote ACK signal from the remote utility metering device indicating that the first data packet was received, the transmitter is further configured to forward the first data packet to the RF driver for re-transmission over the next frequency channel of the predetermined sequence of frequency channels to the remote utility metering device during the next time period of the plurality of sequential time periods and postponing transmission of the second data packet.

2. The data communication utility metering device of claim 1, wherein the RF driver is further configured to repeat the transmission of the first data packet over the next frequency channels according to the predetermined sequence during the next time periods until the remote ACK signal is received and postponing transmission of the second data packet.

3. The data communication utility metering device of claim 2, wherein if the remote ACK signal is not received after repeating the transmission a predetermined number of times, the RF driver stops transmitting data packets.

4. The data communication utility metering device of claim 1, wherein the data communication utility metering device is a slave device and the remote utility metering device is a master device, wherein the information related to the first data packet is a first ACK signal indicating that the first data packet was received, and wherein the information related to the second data packet is a second ACK signal indicating that the second data packet was received.

5. The data communication utility metering device of claim 4, wherein if the RF driver does not receive a data packet during the first time period, the RF driver does not transmit the first ACK signal during the first time period, and wherein the RF driver is further configured to listen to receive the first data packet over the second frequency channel during the second time period and postpone transmission of the second ACK signal.

6. The data communication utility metering device of claim 4, wherein the RF driver is further configured to listen to receive a next data packet over a next frequency channel during a next time period.

7. The data communication utility metering device of claim 1, wherein each of the plurality of sequential time periods has a length of 270 milliseconds.

8. A method for transmitting data in a mesh network distributed throughout a geographical region, the method comprising the steps of:
   causing a master utility metering device to send a hailing signal to a slave utility metering device, the hailing signal causing the slave utility metering device to waken from a sleep mode;
   synchronizing the master utility metering device and the slave utility metering device, after waking the slave utility metering device, by causing the master utility metering device to send a ping signal and by causing the slave utility metering device to return a pong signal, the ping signal including time synchronization information;
   transmitting a data packet from the master utility metering device to the slave utility metering device during a first predetermined time period of a plurality of predetermined time periods, the data packet being transmitted over a frequency channel listed in a predetermined sequence of frequency channels;
   determining, by a processing device, whether an acknowledgement signal and a packet ID were received at the master utility metering device from the slave utility metering device during the first predetermined time period;
   analyzing, by a packet ID manager, the packet ID to determine whether the proper data packet was received at the master utility metering device from the slave utility metering device, and if so, to increment a packet ID to be transmitted with a next data packet;
   if the acknowledgement signal is not received during the first predetermined time period, transmitting the same data packet from the master utility metering device to the slave utility metering device over a next frequency channel listed next in the predetermined sequence of frequency channels during a next predetermined time period of the plurality of predetermined time periods; and
   if the acknowledgement signal is received during the first predetermined time period, transmitting a next data packet from the master utility metering device to the slave utility metering device over the next frequency channel listed next in the predetermined sequence of frequency channels during the next predetermined time period of the plurality of predetermined time periods.

9. The method of claim 8, further comprising the step of repeating the transmitting of the same data packet over the next frequency channels during the next predetermined time periods until an acknowledgement signal is received.

10. The method of claim 9, wherein the step of repeating the transmitting comprises repeating the transmitting of the same data packet up to a predetermined number of times.

11. The method of claim 10, wherein the predetermined number of times is 30.

12. The method of claim 10, wherein, if the predetermined number of times is reached, the method discontinues.

13. The method of claim 8, wherein each predetermined time period has a length of 270 milliseconds.

14. A method for receiving data in a mesh network distributed throughout a geographical region, the method comprising the steps of:
   causing a master utility metering device to send a hailing signal to a slave utility metering device, the hailing signal causing the slave utility metering device to waken from a sleep mode;
   synchronizing the master utility metering device and the slave utility metering device, after waking the slave utility metering device, by causing the master utility metering device to send a ping signal and by causing the slave utility metering device to return a pong signal, the ping signal including time synchronization information;
   waiting to receive a data packet and a first packet ID from the master utility metering device at the slave utility metering device over a first frequency channel during a first predetermined time period of a plurality of predetermined time periods, the first frequency channel being listed in a sequence of a plurality of frequency channels synchronized with the master utility metering device and the slave utility metering device;
   if it is determined by a processing device that a data packet is received at the slave utility metering device, sending an acknowledgement signal and a second packet ID to the master utility metering device indicating that the data packet is received and waiting to receive a next data packet from the master utility metering device over a next frequency channel during a next predetermined time period; and
   if it is determined by the processing device that a data packet is not received at the slave utility metering device, waiting to receive the same data packet from the master utility metering device over the next frequency channel during the next predetermined time period.

15. The method of claim 14, further comprising the step of verifying an identification of a data packet when the data packet is received, by determining whether the first packet ID is identical to a packet ID of a data packet received immediately before the data packet that accompanied the first packet ID.

16. The method of claim 15, wherein the step of verifying the identification of the received data packet further comprises comparing the identification with an identification of a previously received data packet.

17. The method of claim 14, further comprising repeatedly waiting to receive next data packets from the master utility metering device over the next frequency channels during the next predetermined time periods.

* * * * *